Patented Apr. 14, 1936

2,037,203

UNITED STATES PATENT OFFICE 2,037,203

TREATMENT OF PLANTS TO EXPEDITE BUD DEVELOPMENT

Walter A. Wendt, Wahiawa, Territory of Hawaii, assignor to Hawaiian Pineapple Company, Limited, Honolulu, Territory of Hawaii, a corporation of Hawaii No Drawing. Application July 29, 1935,
Serial No. 33,708

7 Claims. (Cl. 47—58)

The present invention relates to the treatment of plants to expedite the formation or development of buds thereon.

The harvest period for the fruit of most plants falls within a comparatively short period of time. The fruit must be picked and either marketed, or preserved as by canning, within this period. This raises problems in the handling of large quantities of fruit and other produce within a comparatively short period of time.

In the case of pineapples, for example, the harvest is largely concentrated in the period between June 15th and September 15th, during which time approximately 75% of the annual tonnage is delivered to the canneries. The remaining 25% of the harvest is spread more or less through the remainder of the year. Considerable attention has been given to attempts to reduce this peak in the harvest and to spread the harvest over a longer period, heretofore without any material success.

An object of my invention is to provide a method of treating plants to expedite the formation or development of buds thereon. Thus I am able to hasten the production of ripe fruit on selected plants, whereby the harvest period may be spread over a longer period of time.

I have discovered that the application of solid calcium carbide to growing plants will expedite the formation of buds and thus the bearing of fruit.

The calcium carbide is most advantageously applied in the heart of the individual plant at or near the growing point. It is advantageously applied to growing plants in the field. Good results have been obtained by the application of varying amounts of carbide, for example from 5 to 20 ounces per 100 plants. Excellent results were obtained, for example, by the application of 10 ounces per 100 plants. The carbide is preferably applied in dry, solid form, although it may be moistened if desired. With pineapple plants, for example, such application of calcium carbide resulted in premature bud formation to the extent of 95 to 100% budding on either plant crop or ratoons within 75 to 90 days.

With pineapple plants, the size and vigor of the sucker at the time of application of the carbide is a consideration. It appears that the transition from leaf growth to bud formation takes place shortly after application of the carbide. A forced under-size sucker will, therefore, produce a small fruit.

While pineapples have been mentioned by way of example in describing my invention, it is to be understood that the invention is by no means limited thereto but that my application of calcium carbide may also be advantageously employed to expedite the formation or development of buds in a wide variety of plants.

My treatment of growing plants with calcium carbide furnishes a convenient, practical and economical method of expediting the development of buds and the production of ripe fruit.

By applying my treatment only to a part of the growing plants, those plants which have received this treatment will produce ripe fruit earlier than plants which have not been so treated, with the result that the harvest may be spread over a longer period of time. This reduction in the harvest peak is of great advantage in facilitating the handling of the crop.

I claim:

1. The process of treating plants to expedite bud formation thereon which comprises applying solid carbide to growing plants in the field, said carbide being applied principally to the heart of the plant at or adjacent the growing point.

2. The treatment of pineapple and similar plants to expedite bud development thereon which comprises applying solid calcium carbide principally adjacent the growing point of the plant.

3. The treatment of pineapple and similar plants to expedite the development of buds thereon which comprises applying calcium carbide to growing plants in the field, said carbide being applied in the heart of the plant at or adjacent the growing point.

4. The process of treating growing pineapple plants to expedite fruit-bud development thereon which comprises applying dry, solid calcium carbide to the heart of the plant adjacent the growing point of the plant.

5. The process of treating plants to expedite bud formation thereon which comprises applying solid calcium carbide to growing plants, said carbide being applied at or adjacent the growing point of the plant prior to significant bud formation on the plant.

6. The process of treating plants to expedite bud formation thereon which consists of applying solid carbide at or adjacent the growing point of the plant.

7. The treatment of pineapple plants to expedite the development of buds thereon which comprises applying calcium carbide to growing plants in the field, the application of said carbide being confined to the heart of the plant at or adjacent the growing point.

WALTER A. WENDT.